2,793,219

PROCESS OF DIMERIZING MONOUNSATURATED FATTY ACIDS

Fred O. Barrett, Springdale, and Charles G. Goebel and Robert M. Peters, Cincinnati, Ohio, assignors to Emery Industries, Inc., Cincinnati, Ohio, a corporation of Ohio No Drawing. Application December 13, 1954, Serial No. 475,005

12 Claims. (Cl. 260—407)

This invention relates to a method of manufacturing dimerized fatty acids from monounsaturated fatty acids such as oleic acid, its isomers, erucic acid, its isomers, undecylenic acid and other monounsaturated fatty acids having a chain length of 11 to 22 carbon atoms, whether of animal, vegetable, marine or synthetic origin. A 36-carbon dicarboxylic dimerized acid is the typical end product of the practice of the method of the present invention. The method comprises heating a monounsaturated fatty acid, such as oleic acid, with crystalline clay mineral and water. The heating is done under pressure or in equipment provided with a reflux condenser, so that moisture remains present in the reacting admixture.

It has long been known that polyunsaturated fatty acids and their alkyl esters slowly polymerize on prolonged heating at elevated temperatures, for instance temperatures in excess of 260° C. and it has been suggested that catalysts tend to accelerate such polymerization. It has also been known that methyl oleate could be dimerized to a limited extent when subjected to very severe thermal treatment. The present invention resides in the discovery and determination that a monounsaturated fatty acid, such as oleic acid, may be dimerized by a relatively fast and low temperature treatment to provide a yield of dimeric acid as high as 60%, based on the weight of the oleic acid treated. The yield of polymer is substantially higher if the acid itself is dimerized than if an alkyl ester is treated. The color of the resulting dimeric acids is excellent and there is very little degradation or production of worthless by-products.

In the past, the production of polymerized polycarboxylic fatty acids has required starting materials which were rich in polyunsaturated components, such as drying and semi-drying vegetable and marine oils. The former have usually been suggested in the literature. The present invention, on the contrary, may be practiced with commercial oleic acid, the mixed fatty acids from animal fats or vegetable oil acids of low IV, such as olive, palm and peanut oil acids, all of which contain substantial quantities of oleic acid. For convenience, commercial oleic acid will be referred to as a typical feed stock.

Commercial oleic acid of good quality includes a minor percentage, perhaps 5 to 10%, of saturated fatty acids such as stearic and palmitic acids and also a minor percentage of polyunsaturated fatty acids, perhaps 5 to 15%, such as linolenic and linoleic acids. After dimerization substantially all of the unpolymerized acids are distilled from the polymerized acids. For convenience, these end products will be referred to as polymer and monomer or as polymerized or dimerized acids and monomeric acids. The saturated acids, when present, do not seem to enter into the polymerization process and distill with the monomer, whereas most of the polyunsaturated acids polymerize and remain with the dimerized oleic acid. It is, therefore, possible to practice the process of this invention on various admixtures of fatty acids which contain substantial quantities of saturated fatty acids and/or polyunsaturated fatty acids in addition to the monounsaturated fatty acids.

The polyunsaturated fatty acids polymerize more readily than the oleic acid and further tend to form more highly polymerized products than pure oleic acid. It follows that the characteristics of the polymer may be determined and controlled to some degree by blending in polyunsaturated acids with the oleic acid being treated. However, the total yield of polymer cannot be substantially increased by the addition of the polyunsaturated fatty acids as there appears to be an upper limit to which any given mixture of fatty acids can be polymerized in a practical operation. In other words, even if pure oleic acid can be dimerized by this process to provide a yield of substantially 50% polymeric acid, the same process, if applied to a mixture of 50% oleic acid and 50% polyunsaturated acids, does not polymerize 50% of the oleic acid present in addition to the more readily polymerized polyunsaturated acids. Inasmuch as the chemical mechanism of the process has not been fully established, the explanation for the lower than theoretically expected yield cannot now be provided. The generality seems to be that the treatment progressively diminishes the tendency or capacity of the acids to polymerize, perhaps because of isomerization, so that the preferential polymerization of the polyunsaturated acids tends to preclude substantial dimerization of the oleic acid present.

Inasmuch as the presence of polyunsaturated fatty acids provides the possibility of polymerization of molecules of polyunsaturated acids with each other and molecules of polyunsaturated acids with molecules of monounsaturated acids, as well as dimerization of two molecules of monounsaturated acids, the latter type of dimerization is not apt to occur to a significant degree if the quantity of polyunsaturated acids present exceeds the quantity of monounsaturated acids present.

Regardless of the exact mixture of acids which is used as the feed stock, the preferred process of this invention involves the heating of the acidic feed stock with approximately 2–6% clay and 1–5% water at a temperature approximately 200–260° C. for a period of from two to four hours. The heating is preferably performed in a pressure vessel adapted to maintain a steam pressure of 70 to 160 pounds per square inch and the contents of the vessel are agitated during the heating to provide the greatest possible amount of surface contact between the acids being treated and the clay. If desired, a reflux condenser may be used in place of the pressure vessel to retain water in the reaction zone.

At the end of the heating period the contents of the vessel are cooled to a temperature of 100 to 140° C., the excess water is bled off and clay is removed by filtering or centrifuging, preferably the former. The monomeric and polymeric fatty acids are then separated from each other, preferably by distillation under reduced pressure. The yield of polymer depends in part upon the nature of the feed stock and in part upon the length of treatment, but if commercial oleic acid is subjected to the general type of treatment described, the yield amounts to approximately 50% polymer and 50% monomer.

The choice of temperature depends upon a number of factors. In general, low temperatures tend to produce light-colored products with minimum production of by-products which are not good quality fatty acids suitable for sale as such. The desired polymerization commences at a temperature as low as 180° C. but higher temperatures which provide faster polymerization are desirable for practical commercial operations. If the color of the polymer and the value of the monomer are not factors of importance, then the process may be conducted very rapidly at temperatures as high as from 275 to 300° C. Such high temperatures, however, produce dark-colored polymers and monomers of impaired value as fatty acids. As a practical matter, we prefer to operate in the range of 200 to 260° C. in order to obtain reasonably light-colored products and reasonable efficiency, in the sense of through-put in relation to the size of the equipment, and still hold waste by-product losses within reasonable bounds.

The amount of water employed may also be varied over considerable range, but the best yields are obtained if the weight of the water used is substantially 1 to 5% the weight of the fatty acids treated, with 2% very satisfactory for most operations. The yields of dimer go down appreciably if less than 1% or more than 5% water is used.

The amount of clay to be used depends upon the nature of the specific clay in question. For promoting dimerizing reaction of this invention the clays from some deposits are more powerful than the clays from other deposits. The acid activated clays generally function better than the unactivated clays. Since the clay must be removed from the mixed fatty acids after dimerization, it is desirable to use as little clay as possible, not only because of expense, but because of filtering difficulties. While certain naturally occurring clays such as Fuller's earth and clay known as Pikes Peak clay, because it is mined at Pikes Peak, Georgia, may be used, we prefer to use an acid activated clay, such as one of the Filtrols manufactured by the Filtrol Corp. "Filtrol" is defined in "Handbook of Material Trade Names"; authors, O. T. Zimmerman, Ph. D., and Irvin Lavine, Ph. D.; copyright 1946, 1953; published by Industrial Research Service, Dover, New Hampshire, 1953. This definition reads as follows:

"Filtrol (R), a group of acid-activated adsorbents and catalysts made from the mineral montmorillonite (MgCa)OAl25SiO2nH2O. They are supplied as fine white powders, 85–95% passing through a 200-mesh screen."

The polymerization reactions will proceed slowly, at least if even a small amount of clay, such as 1%, is present, and the reactions proceed more rapidly if the clay, fatty acids and water are agitated to keep the clay in suspension at all times. With a powerful acid activated clay such as that sold under the trade name "Filtrol," grade 20 adsorbent, by The Filtrol Company, a quantity of clay equal to 6% of the weight of the acids being treated promotes the reactions at a rate which is not materially increased by the use of greater quantities of clay. However, as much as 20% clay may be used, although the greater quantities may complicate filtration without compensating advantages.

In general, all of the common commercial abundant, crystalline, clay minerals may be used, such as: montmorillonite, kaolinite, hectorite, halloysite, attapulgite, sepialite. As a generality, clays vary considerably in composition, depending upon the locality of the deposit and other factors, and many of the commercial clays are mixtures of different chemical compounds. For instance, the commercial bentonites may be used in the practice of this process if they contain sufficient montmorillonite, say 75%. Commercial clays having lesser percentages of crystalline clay mineral may be employed, but it is the crystalline clay minerals which promote the reaction. While there may be rare crystalline clay minerals which cannot be used in this process, such clay minerals are not commercial products and are not mined for the market. All of the mined commercial crystalline clay minerals may be used in this process with good results. The bentonitic clays containing at least 75% montmorillonite are particularly recommended. Also, the pH of the clay is preferably above 2 but below 7; for best results the clay should have a pH in the neighborhood of 3 to 5. While more acid clays may be employed, their use tends to promote the formation of non-saponifiable components in the monomer.

All of the above specified factors must be adjusted in the relation to one another and in relation to the raw material being treated to provide dimeric and monomeric end products of the greatest total value, and the variation of any single factor alters the characteristics of the end products, at least somewhat.

Whatever temperatures and other operating conditions be chosen, the duration of the treatment is of substantial importance. The reaction tends to go rapidly at first and then gradually to slow down. Prolonged continuation of the treatment tends to produce little more dimer but to produce more waste components in the monomer. The optimum stopping point is primarily a matter of economics.

However, in order to produce a true dimeric acid it is necessary to continue the treatment until intermediate reaction products have been substantially converted to dimer. In other words, if the process is stopped too soon, the non-volatile residue is a mixture of dimer and intermediate reaction products. The presence of these intermediate reaction products in the non-volatile residue is indicated by comparison of the neutralization equivalent and the saponification equivalent of the residue.

For instance, in the treatment of commercial oleic acid, if the process is improperly stopped in an early stage, the neutralization equivalent of the non-volatile residue may be as high as 400 while the saponification equivalent may be as low as 285. In order to have an end product which may be properly termed dibasic acid, the treatment should be continued until the neutralization equivalent is down to somewhere near 300, or even a little below. The continuation of the treatment develops more and more free polymeric fatty acid, i. e., it lowers the neutralization equivalent, but at the same time, continuation of the treatment tends to elevate the neutralization equivalent and saponification equivalent of the monomer thus impairing its value as a fatty acid mixture.

In making the dibasic acids of this invention, it is recommended that the treatment be continued until the neutralization equivalent is in the range of 290 to 320. Preferably, in working with the materials specified, the treatment is continued until the neutralization equivalent is within 25, or preferably 15, points of the saponification equivalent. In general, this specified degree of dimerization is accomplished by a treatment of substantially one to five hours, the exact time depending upon the temperature, the physical equipment, the amount and quality of clay employed, the amount of water utilized and the exact nature of the raw material being treated.

The iodine values of the dimerized fatty acids of this invention are believed not to be a true measure of unsaturation, i. e. presence of double bonds, but, nevertheless, to be significant as indicating structural variations. In general the I. V. of dimerized fatty acids of this invention fall in the range of substantially 95 to 145 (Wij's method). If special oleic acids which are low in polyunsaturants are treated, the I. V. of the resulting dimer tends to be in the neighborhood of the lower limit specified. If commercial oleic acid, the fatty acids from animal fats and greases or the fatty acids of olive, palm and peanut oils are treated, the I. V. of the resulting polymer is in the general range of substantially 100 to 120. If greater amounts of polyunsaturants are present in the starting material, the I. V. of the mixed polymers containing the dimeric acids may be in the neighborhood of 145. But, as previously indicated, the amount of polyunsaturated acids in the feed stock should be less than the amount of monounsaturated acids in the feed stock in order to obtain any significant yield of dimerized monounsaturated acids.

Although the particle size of the clay is not of critical importance from the point of view of effecting the dimerizing reaction, the particle size is of considerable importance from the point of view of practical operations. Inasmuch as the clay is functioning by contact at its surface, the amount of exposed surface is significant, that is, the greater the area of the exposed surface, the greater is the reaction produced. A clay ground to such fineness that 93 to 95% passes a 200 mesh screen is satisfactory for the practice of the method of this invention on a commercial scale. The relatively fine particles settle less rapidly from the fatty acids in the presence of physical agitation than coarser particles or, otherwise expressed, the use of the fine clay reduces the severity of the agitation required. Further, the clay of the fineness described may be removed from the fatty acids by conventional filtering techniques and without specially designed filtering equipment.

The process of this invention as a whole involves the heating of a feed stock containing monounsaturated fatty acids, clay and water in a vessel adapted to withstand a pressure of 140 to 160 pounds per square inch or equipped with a reflux condenser to retain the water in the reaction vessel. A rocking autoclave or an autoclave equipped with stirring mechanism is suitable for use as the reaction vessel. The fatty acids, clay and water are preferably agitated continuously during the heating period.

After the conclusion of the heating treatment, the reaction vessel is vented to permit the water present to flash off, and the temperature of the fatty acids and clay is reduced to the range of substantially 100 to 140° C., at which temperature they are filtered. The flashing off of the water is important because the presence of free water in the filtering operation tends to convert the clay to an impervious mass on the filter. While higher filtration temperatures may be used if desired, the mixture of monomeric and dimeric fatty acids is sufficiently fluid at the temperatures indicated to filter readily. The following examples all involve the use of the general process just described. In these examples the I. V.'s were determined by the standard Wij's method and the colors by the Gardner standards of 1933. The neutralization equivalent and saponification equivalent were run by standard methods. All quantities and proportions which are indicated in the foregoing description and in the following examples and claims are by weight.

Example 1

100 parts of commercial oleic acid having an I. V. of 89.5, a neutralization equivalent of 280, a saponification equivalent of 276 and a Gardner color of 2 were heated with 4 parts of Pikes Peak clay from Pikes Peak, Georgia, and 2 parts of water in a rocking type autoclave for four hours at 240° C. At the end of the heating period, the contents of the autoclave were cooled to a temperature slightly above 100° C., the pressure released to flash off the water, after which the fatty acids were filtered to remove the clay. The filtrate, consisting of a mixture of polymerized and non-polymerized acids, was subjected to distillation under a pressure of 2 mm. of mercury and at a maximum temperature in the still of 270° C. The residue in the still, amounting to 45 parts, consisted of polymeric acids having an I. V. of 114, a neutralization equivalent of 300, a saponification equivalent of 280, and a color of 8 Gardner. The distillate consisted of 55 parts of monomeric acids having an I. V. of 72, a neutralization equivalent of 298, a saponification equivalent of 270 and a color of 1 Gardner.

Example 2

100 parts of animal grease fatty acids having an I. V. of 63, a neutralization equivalent of 276, a saponification equivalent of 270, were heated in an autoclave, which was equipped to agitate the contents for a period of four hours at 230° C., with 4 parts of "Filtrol" and 2 parts of water. Water was removed and the resulting product was filtered and distilled as disclosed in Example 1. The residue in the still, amounting to 30 parts, consisted of polymeric acids having an I. V. of 111, a neutralization equivalent of 299, a saponification equivalent of 290, and a color of 8 Gardner. The distillate consisted of 70 parts monomeric acids having an I. V. of 30, a neutralization equivalent of 292, a saponification equivalent of 278, and a color of 1 Gardner.

Example 3

100 parts of commercial oleic acid of the type used in Example 1 were processed in a rocking type autoclave with 2 parts of "Filtrol" and 4 parts of water. The autoclave was heated until a temperature of 260° C. was reached, and this temperature was maintained for two hours. The contents of the autoclave were then freed of water, filtered and distilled, as disclosed in Example 1. The residue in the still, amounting to 45 parts, consisted of polymeric acids having an I. V. of 120, a neutralization equivalent of 304, a saponification equivalent of 292, and a color of 9 Gardner. The distillate consisted of 55 parts monomeric acids having an I. V. of 62, a neutralization equivalent of 320, a saponification equivalent of 290, and a color of 1 Gardner.

Example 4

100 parts of commercial undecylenic acid having an I. V. of 130, a neutralization equivalent of 195, and a saponification equivalent of 189 were heated in a rocking autoclave for two hours at 260° C. with 2 parts of "Filtrol" and 2 parts of water. After removal of water and filtration, the products of the reaction were separated by distillation under reduced pressure. The residue in the still amounted to 66% polymeric acids having an I. V. of 125, a neutralization equivalent of 210, a saponification equivalent of 199, and a color of 6 Gardner. The distillate amounted to 34 parts monomeric acids having an I. V. of 72, a neutralization equivalent of 225, a saponification equivalent of 209, and a color of 1 Gardner.

Example 5

100 parts of erucic acid from rapeseed oil, having an I. V. of 73, a neutralization equivalent of 319 and a saponification equivalent of 315 were heated in a rocking autoclave with 4 parts of "Filtrol" and 2 parts of water for a period of four hours at a temperature of 230° C. After removal of water, filtration and separation of the products by distillation under reduced pressure, a yield of 45 parts polymerized acids was recovered, having an I. V. of 95, a neutralization equivalent of 338, a saponification equivalent of 325, and a color of 9 Gardner. The monomeric acids, amounting to 55 parts, had an I. V. of 51, a neutralization equivalent of 343, a saponification equivalent of 321, and a color of 1 Gardner.

Example 6

100 parts of elaidic acid having an I. V. of 80, a neutralization equivalent of 283, and a saponification equivalent of 280 were heated in a rocking autoclave with 4 parts of "Filtrol" and 4 parts water for a period of four hours at a temperature of 230° C. After removal of water, filtration and distillation of the monomeric acids under reduced pressure, the residue amounted to 50 parts dimeric acids having an I. V. of 99, a neutralization equivalent of 300, a saponification equivalent of 286, and a color of 8 Gardner. The monomeric acids, amounting to 50 parts, had an I. V. of 48, a neutralization equivalent of 314, a saponification equivalent of 288, and a color of 1 Gardner.

Example 7

A fatty acid rich in oleic acid was obtained by pressure splitting, distilling and bleaching sulfur olive oil foots acids. 100 parts of this acid, 4 parts "Filtrol" and 2 parts water were heated together in a rocking-type autoclave for a period of 4 hours at a temperature of 230° C. The steam pressure was 140 pounds per square inch, After water removal, filtration and distillation of the monomeric acids under reduced pressure the residue amounted to 48 parts polymerized acids having an I. V. of 114, a neutralization equivalent of 302, a saponification equivalent of 287, and a color of 8 Gardner. The monomeric acids, amounting to 52 parts, had an I. V. of 59, a neutralization equivalent of 324, a saponification equivalent of 289, and a color of 1 Gardner.

*Example 8*

100 parts of commercial oleic acid were heated with 8 parts "Filtrol" and 1½ parts water in a stirring-type autoclave for a period of 4½ hours at a temperature of 215° C. The reacted mixture was freed of water, cooled and filtered to remove the "Filtrol;" after which the unpolymerized acids were separated from the polymerized acids by distillation under reduced pressure. The polymerized acids amounted to 48 parts having an I. V. of 115, a neutralization equivalent of 301, a saponification equivalent of 285, and a color of 7 Gardner. The monomeric acids amounted to 52 parts and had an I. V. of 58, a neutralization equivalent of 315, a saponification equivalent of 277, and a color of 1 Gardner.

*Example 9*

100 parts of commercial oleic acid, 20 parts of "Filtrol" and 1 part of water were heated together in a rocking autoclave at a temperature of 180° C. for a period of 5 hours, after which the products of the reaction were freed of water, filtered, and the monomeric fraction removed by distillation under reduced pressure. The polymerized acids amounted to 53 parts having an I. V. of 112, a neutralization equivalent of 300, a saponification equivalent of 286, and a color of 11 Gardner. The monomeric acids amounted to 47 parts and had an I. V. of 52, a neutralization equivalent of 305, a saponification equivalent of 278, and a color of 1 Gardner.

From the foregoing description and examples it is apparent that the method or process of the present invention may be practiced with a substantial range of feed stocks, that the time of treatment, temperature of treatment, amount of clay and amount of water may be varied over a substantial range, and that the exact character of both the polymeric and monomeric end products varies somewhat, depending upon the specific conditions of the treatment and the feed stock treated.

In general, the preferred feed stock is a mixture of fatty acids high in oleic acid content and low in content of polyunsaturated acids. Preferably 2 to 6 parts of clay of the "Filtrol" type is employed per 100 parts of feed stock. Preferably 1 to 5 parts water per 100 parts of feed stock are utilized. The preferred temperature range is 215 to 240° C. and the preferred time of treatment is from 2 to 4 hours, but in any case, the period of treatment is of sufficient duration to reduce the neutralization equivalent of the polymer to a value below 320 and preferably in the neighborhood of 300 or below. When the preferred process is practiced, the result is the conversion of approximately 50% of the oleic acid present to polycarboxylic acids and primarily to the 36-carbon dicarboxylic acid constituted by the dimerization of two oleic acid molecules.

Claims which are specific to the use of the type of process herein disclosed for the polymerization of polyunsaturated fatty acids appear in our copending application Serial No. 475,006, filed on even date herewith.

Having described our invention we claim:

1. The method of dimerizing commercial oleic acid which comprises heating it to a temperature between 180° and 300° C. for a period of from one to six hours in the presence of 1 to 20% crystalline clay mineral having a pH of 2–7 and about 1 to 5% water and agitating the oleic acid, crystalline clay mineral and water during said treatment, the temperature, the time, the amount of crystalline clay mineral and the amount of water all being coordinated to provide polymerization over and above the polymerization of the poly-unsaturated components of the oleic acid, whereby two molecules of oleic acid combine to form a single molecule of dicarboxylic acid.

2. The method of dimerizing a portion of the oleic acid component of a mixture of animal fatty acids, said method comprising heating said mixture of fatty acids in the presence of 1 to 20% acid activated crystalline clay mineral having a pH of 2–7 and in the presence of about 1 to 5% water, a temperature of substantially 180 to 260° C. for a period of substantially two to four hours, maintaining the activated crystalline clay mineral in suspension in the mixture of animal fatty acids and water by agitation, removing the acid activated clay from the mixture of animal fatty acids by filtration after the termination of the heating period, and distilling the monocarboxylic fatty acids from a residue of polycarboxylic fatty acids.

3. The method of dimerizing oleic acid which comprises heating a feed stock which is comparatively rich in oleic acid with crystalline clay mineral and water, the proportions being substantially 2 to 6 parts crystalline clay mineral having a pH of 2–7 and 2 to 4 parts water to 100 parts of feed stock, at a temperature of substantially 215 to 240° C. for a period of substantially 2 to 6 hours, but sufficiently long to reduce the N. E. of the polymer component below 320, agitating the feed stock, crystalline clay mineral and water together during the period of heating, removing the water from the acids and the crystalline clay mineral after termination of the heating treatment, filtering out the crystalline clay mineral and removing the monomeric acids from the polymeric acids by distillation under reduced pressure.

4. The method of dimerizing a monounsaturated fatty acid which comprises heating said fatty acid to a temperature substantially in the range 180–300° C., for a period of substantially 1–6 hours in the presence of substantially 1–20% crystalline clay mineral having a pH of 2–7 and about 1–5% water and agitating the fatty acid crystalline clay mineral and water during said treatment, the temperature, the time, the amount of crystalline clay mineral and the amount of water all being coordinated to provide polymerization wherein two molecules of monounsaturated fatty acid combine to form a single molecule of dicarboxylic acid.

5. Dimerized oleic acid produced by the method of claim 4.

6. Dimerized undecylenic acid produced by the method of claim 4.

7. Dimerized erucic acid produced by the method of claim 4.

8. Dimerized elaidic acid produced by the method of claim 4.

9. Dimerized animal fatty acids produced by the method of claim 2.

10. The method of dimerizing a monounsaturated fatty acid which comprises heating said fatty acid to a temperature substantially in the range 215–240° C., for a period of substantially 2–4 hours in the presence of substantially 2–6% crystalline clay mineral having a pH of 3–5 and about 1–5% water and agitating the fatty acid crystalline clay mineral and water during said treatment, the temperature, the time, the amount of crystalline clay mineral and the amount of water all being coordinated to provide polymerization whereby two molecules of monounsaturated fatty acid combine to form a single molecule of dicarboxylic acid.

11. The method of dimerizing monounsaturated fatty acids to produce polycarboxylic fatty acids which comprises heating the monounsaturated fatty acids and agitating them in the presence of a crystalline clay mineral having a pH of 2–7, the weight of the clay mineral being substantially 1–20% of the weight of the fatty acids, and in the continuing presence of a small amount of water of the order of 1–5% of the weight of the fatty acids until the neutralization equivalent of the polymerized products is reduced to no more than 25 units higher than their saponification equivalent, the reaction being conducted in a temperature range of substantially 180–300° C., the temperature which is utilized being sufficiently high to promote the reaction to the specified degree.

12. The method of dimerizing the monounsaturated fatty acids to produce dicarboxylic fatty acids which comprises heating the monounsaturated fatty acids and agitating them in the presence of a crystalline clay mineral having a pH of 2–7, the weight of the clay mineral being substantially 2–6% of the weight of the fatty acids, and in the continuing presence of a small amount of water of the order of 1–5% of the weight of the fatty acids until the neutralization equivalent of the polymerized products is reduced to no more than 25 units higher than their saponification equivalent, the reaction being conducted in a temperature range of substantially 215–240° C., the temperature which is utilized being sufficiently high to promote the reaction to the specified degree, filtering the mixed acids to remove the clay and distilling the unreacted fatty acids from the residue.

References Cited in the file of this patent

UNITED STATES PATENTS

| | | |
|---|---|---|
| 2,347,562 | Johnston | Apr. 25, 1944 |
| 2,417,738 | DeGroote | Mar. 18, 1947 |
| 2,482,760 | Goebel | Sept. 27, 1949 |
| 2,482,761 | Goebel | Sept. 27, 1949 |

OTHER REFERENCES

Markley, "Fatty Acids," copyright 1947, page 331.